Oct. 7, 1947.  W. S. PARK  2,428,432
AERIAL TRAINER
Filed Feb. 8, 1943  9 Sheets-Sheet 1
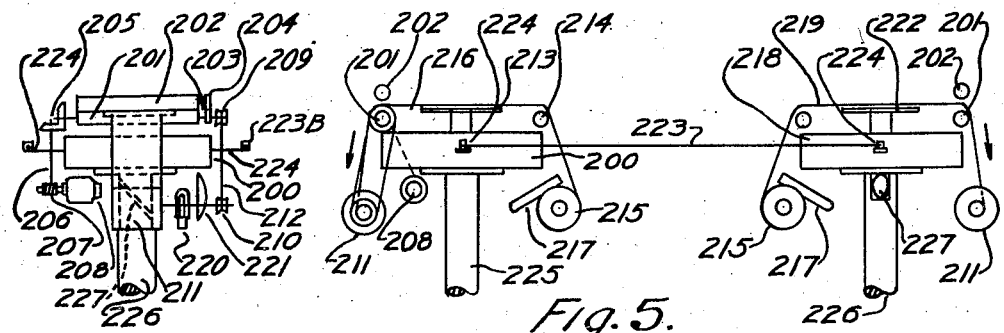
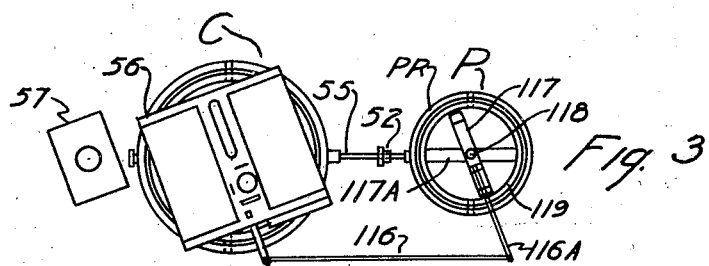
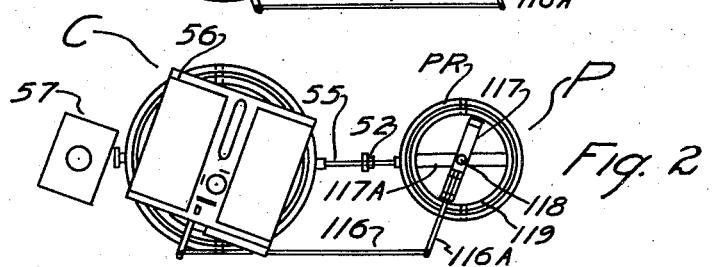
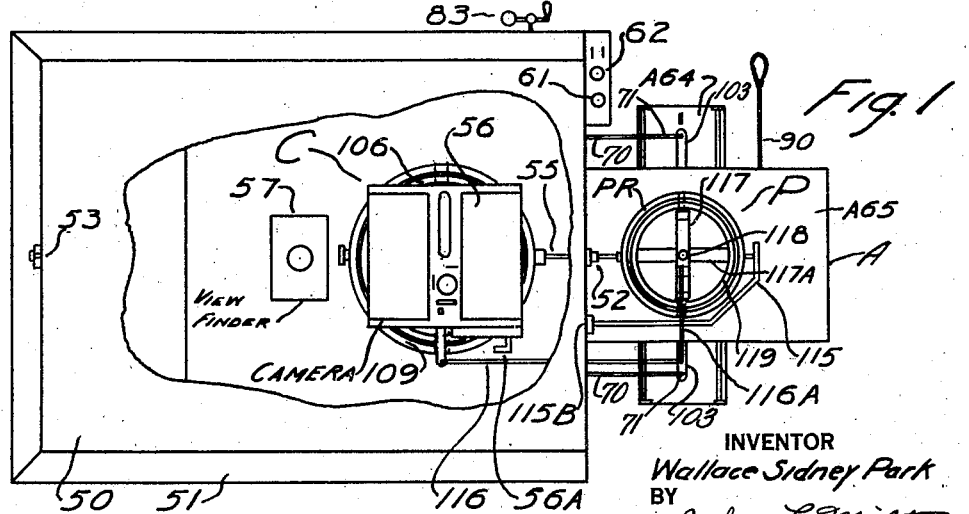
INVENTOR
Wallace Sidney Park
BY
John L. Milton
ATTORNEY

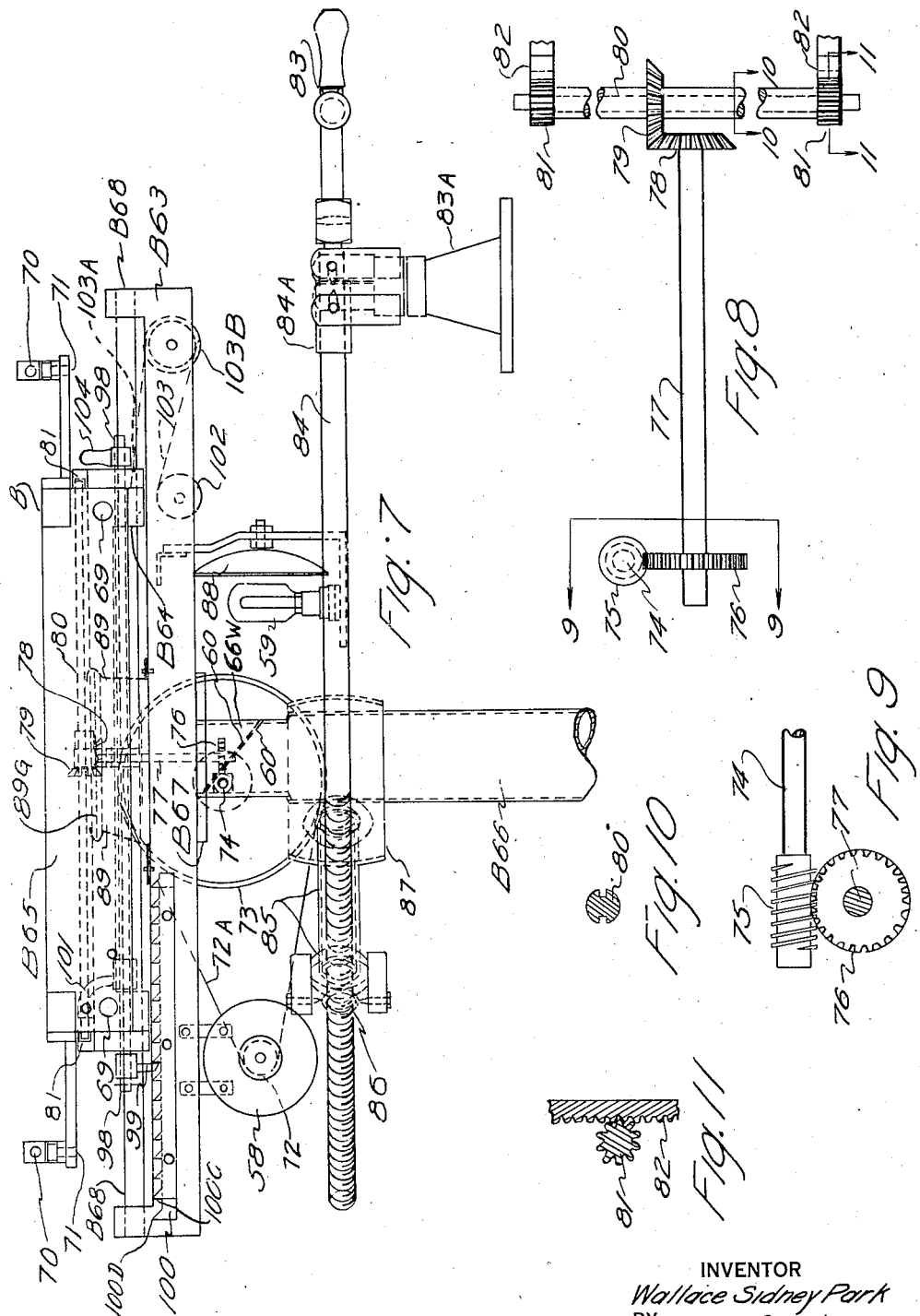

Oct. 7, 1947.  W. S. PARK  2,428,432
AERIAL TRAINER
Filed Feb. 8, 1943  9 Sheets-Sheet 4
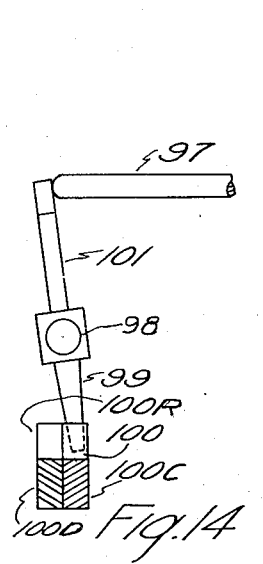
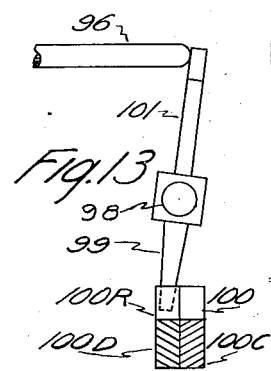
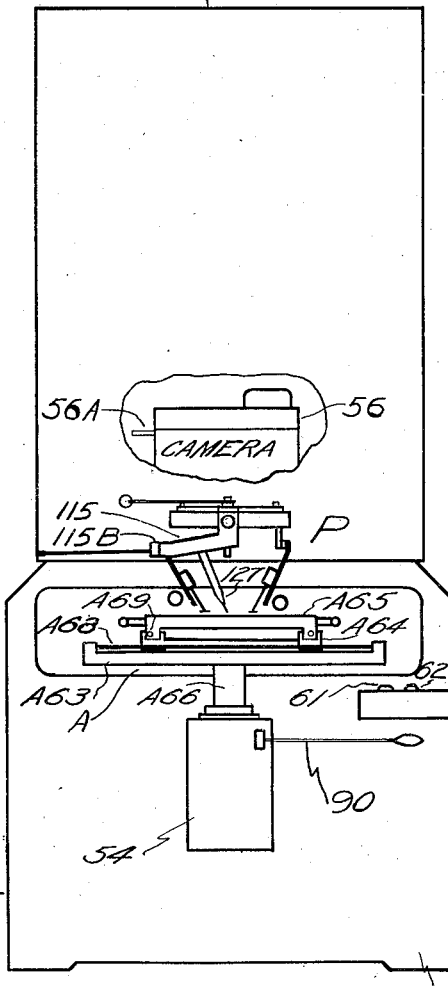
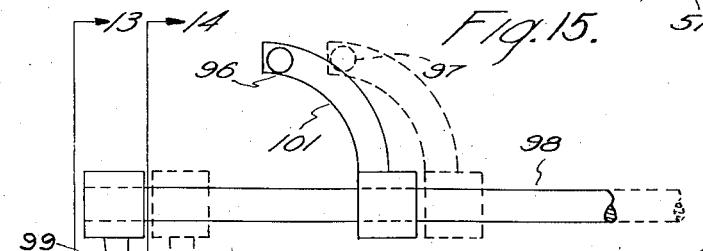
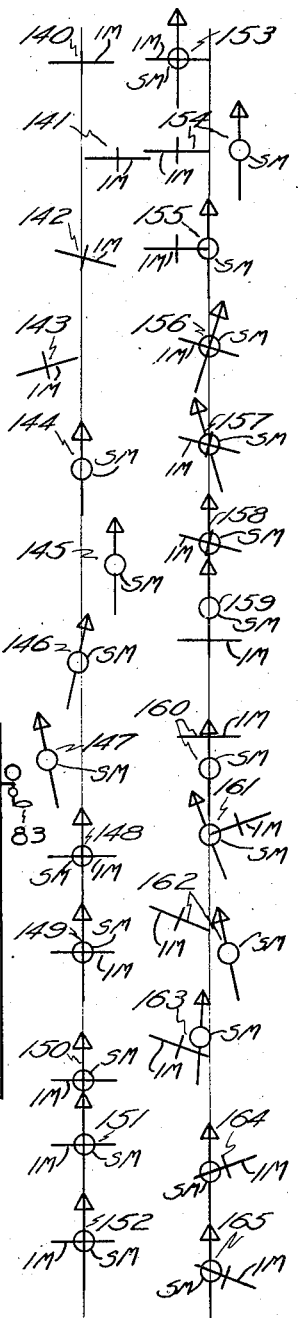
INVENTOR
Wallace Sidney Park
BY John L. Milton
ATTORNEY

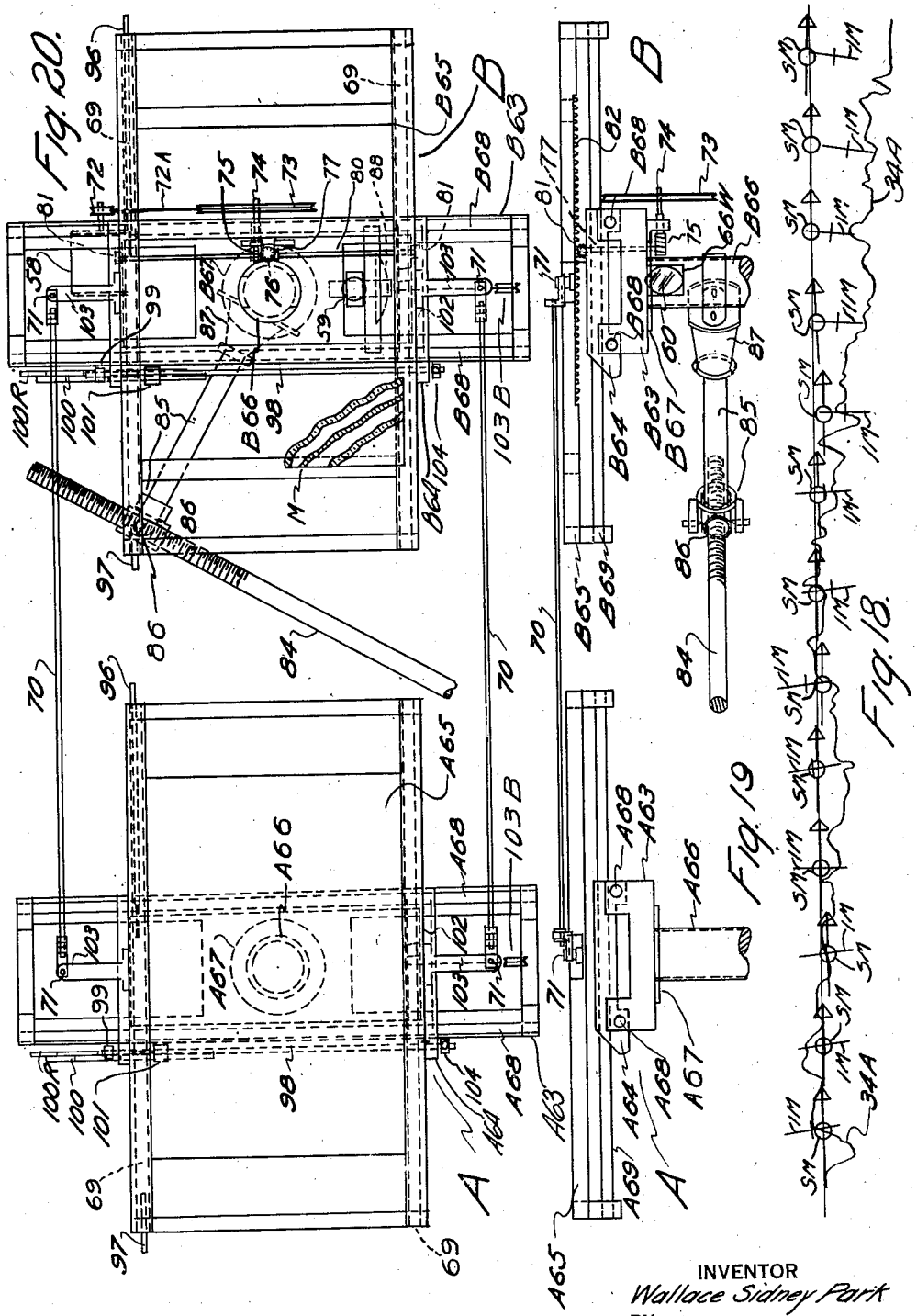

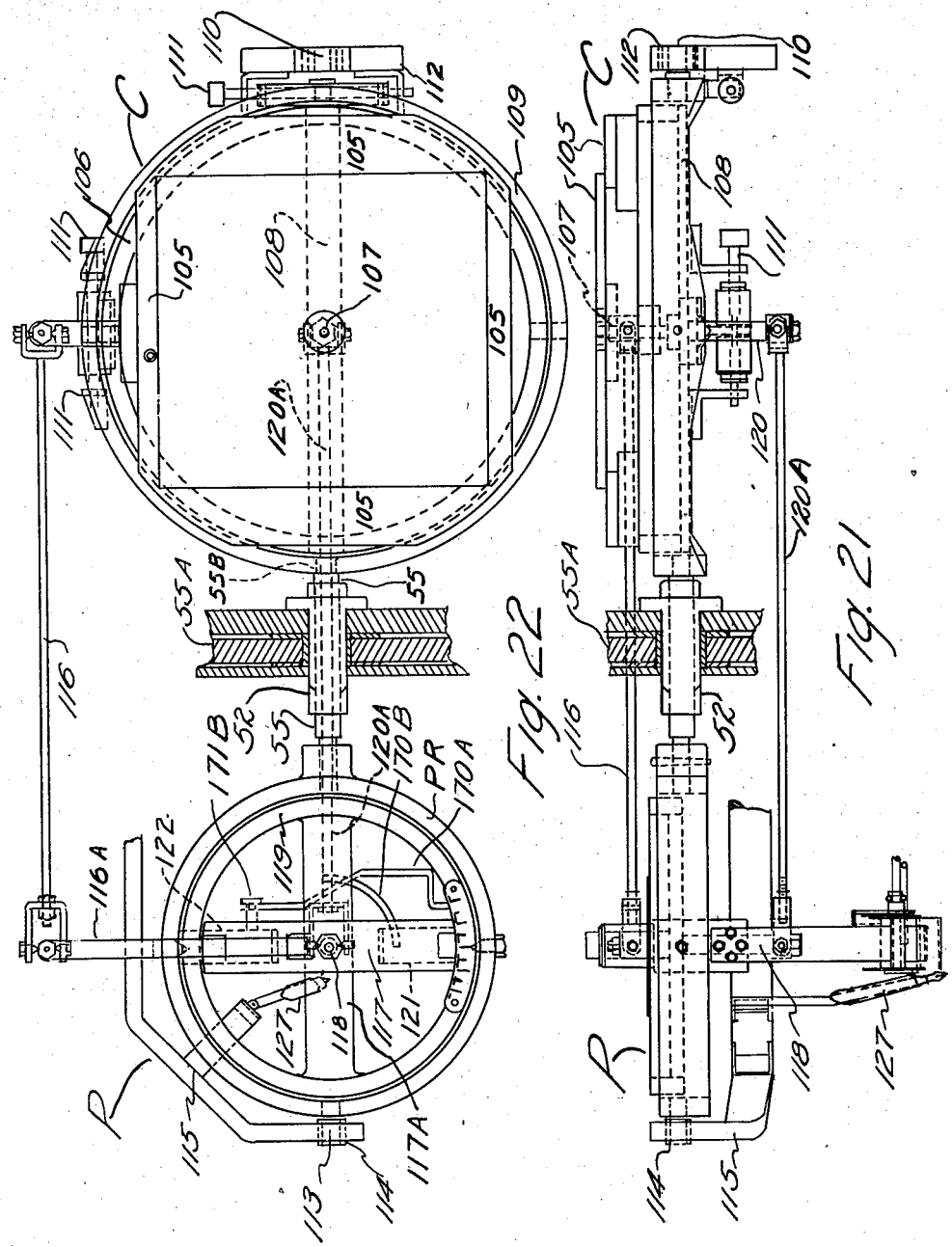

Oct. 7, 1947.  W. S. PARK  2,428,432
AERIAL TRAINER
Filed Feb. 8, 1943  9 Sheets-Sheet 7

INVENTOR
Wallace Sidney Park
BY John L. Milton
ATTORNEY

Oct. 7, 1947. W. S. PARK 2,428,432
AERIAL TRAINER
Filed Feb. 8, 1943 9 Sheets-Sheet 8
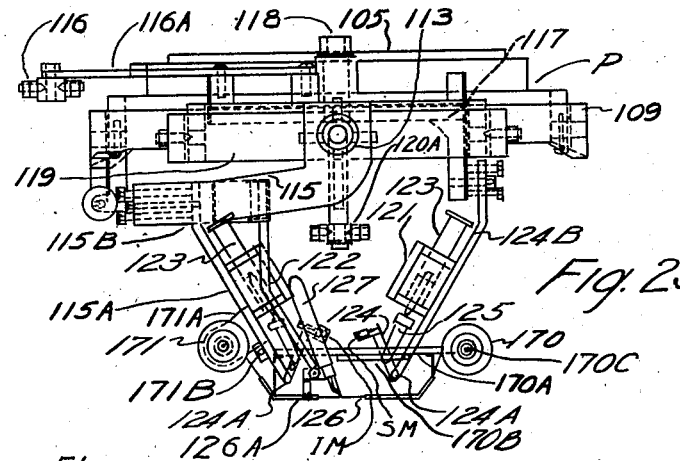
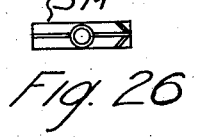
Fig. 26
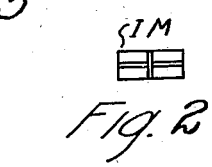
Fig. 27
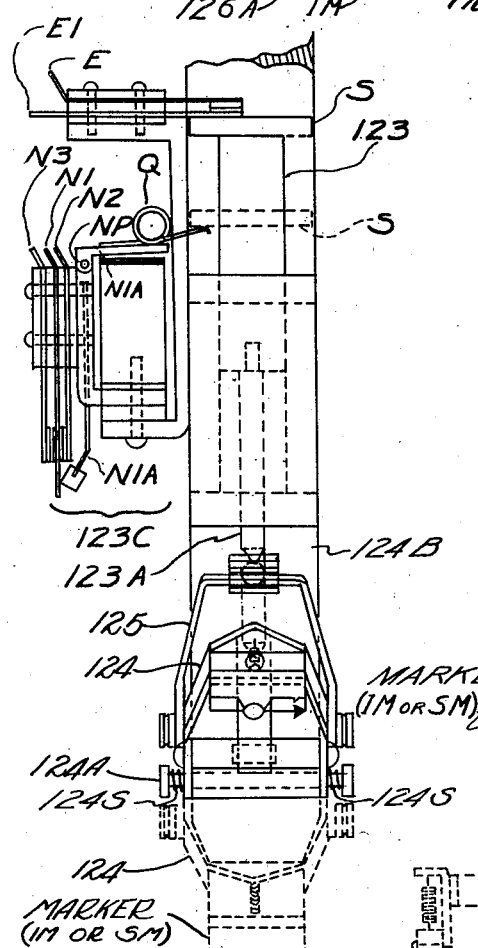
Fig. 28
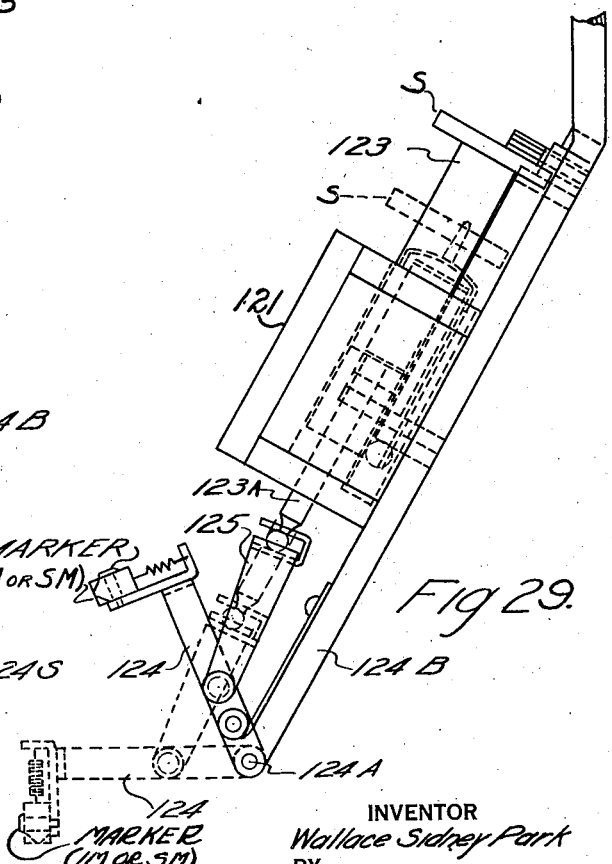
Fig. 29
INVENTOR
Wallace Sidney Park
BY John L. Milton
ATTORNEY

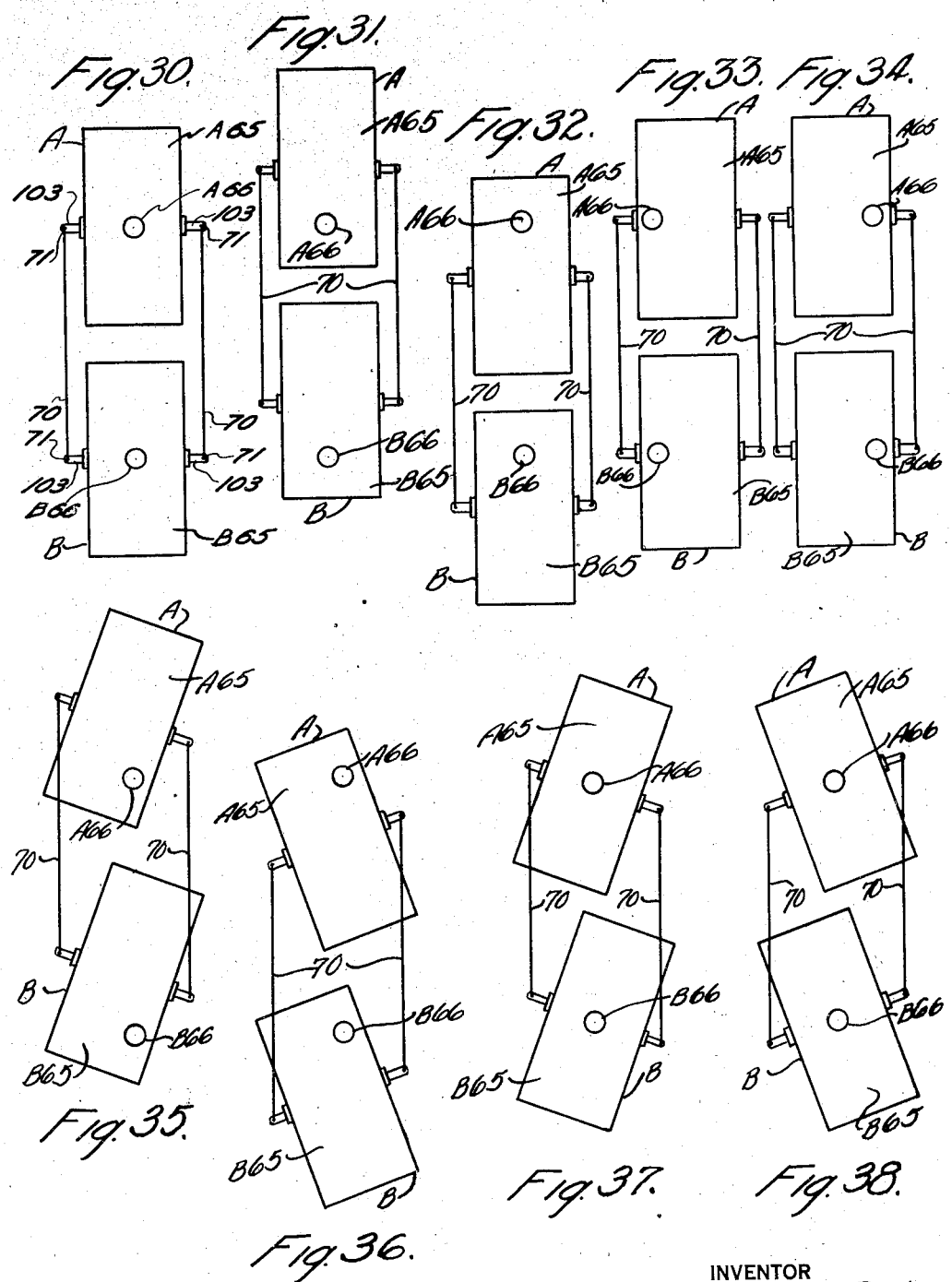

Patented Oct. 7, 1947

2,428,432

UNITED STATES PATENT OFFICE 2,428,432

AERIAL TRAINER

Wallace Sidney Park, Louisville, Ky.

Application February 8, 1943, Serial No. 475,079½

14 Claims. (Cl. 35—25)

1

This invention relates to an aerial trainer of the grounded type, and the method of training aircraft personnel who must be skilled in locating and appraising terranean objects. More particularly, this invention relates to an aerial trainer of the grounded type, and the method of training students to make aerial photographs suitable for aerial mapping.

An object of this invention is to provide apparatus for training student aerial photographers and bombardiers without the use of an aerial vehicle and without actually taking photographs or dropping bombs.

Another object of the invention is to provide apparatus, of the class designated, into which can be simulated the usual difficulties encountered by the photographer or bombardier on a typical mapping or bombing mission. These difficulties are crab, tilt and time interval between the actions of manipulating a camera or a bomb trip mechanism. Obviously, both missions can be combined, and since sighting for aerial-photography and for dropping aerial-bombs are quite similar reference herein to photography is to be understood as referring to both of said arts.

Another object of the invention is to provide means for creating the illusion of an aerial vehicle flying over a terrain or landscape; means for recording the student's manipulation of an aerial camera, and concurrently recording the conditions introduced by an instructor during a given period of training.

A further object of this invention is to provide a trainer susceptible of having all the irregularities and errors of a normal photographing mission introduced therein by the instructor, to tax, confuse and develop the student who is concurrently observing the terrain or landscape and endeavoring to correct for the irregularities introduced by the instructor.

A still further object of the invention is to provide a trainer having a universal mounting for a camera carried by a tiltable cabin of the trainer and a second universal mounting for a printing apparatus that is operatively connected to the cabin of the trainer and the universal mounting for the camera, so that the printing mechanism will shift in exact accordance with the shifting of the camera and the tilting of the cabin.

A further object of this invention is to provide a trainer having an illuminated photographic transparency of the terrain in actual color, longitudinally, rotatably and laterally moved beneath the view finder of the camera to simulate the horizontal flight of an aeroplane, and a recording

2 chart moved beneath the printing mechanism in exact accordance with the movement of the transparency so that the record made upon the chart, will show the relative direction of flight, relative crab and tilt of the trainer cabin carrying the camera and printing mechanism, and the correction introduced by the student at the time of making the photographic exposure.

A full understanding of the structure and operation of a preferred embodiment of this invention, the stated objects and further objects thereof can be obtained by referring to the following drawings, specification and claims:

Figure 1 is a plan view of the trainer with a section of the tiltable cabin cut away to show the relative position of the camera, view-finder and student's seat;

Figure 2 diagrammatically illustrates the camera and printing apparatus set to compensate for approximately 20 degrees crab of the aerial vehicle to the right;

Figure 3 diagrammatically illustrates the camera and printing apparatus set to compensate for 20 degrees crab of the vehicle to the left;

Figure 4 is an end elevational view of Figure 5;

Figure 5 is a side elevational view schematically illustrating a modified arrangement employing a ribbon 219 having imprints thereon simulating the ground movement in place of the mosaic M shown in Figure 20, and a modified arrangement for recording the manipulations of the student made to compensate for the errors introduced by the instructor;

Figure 6:
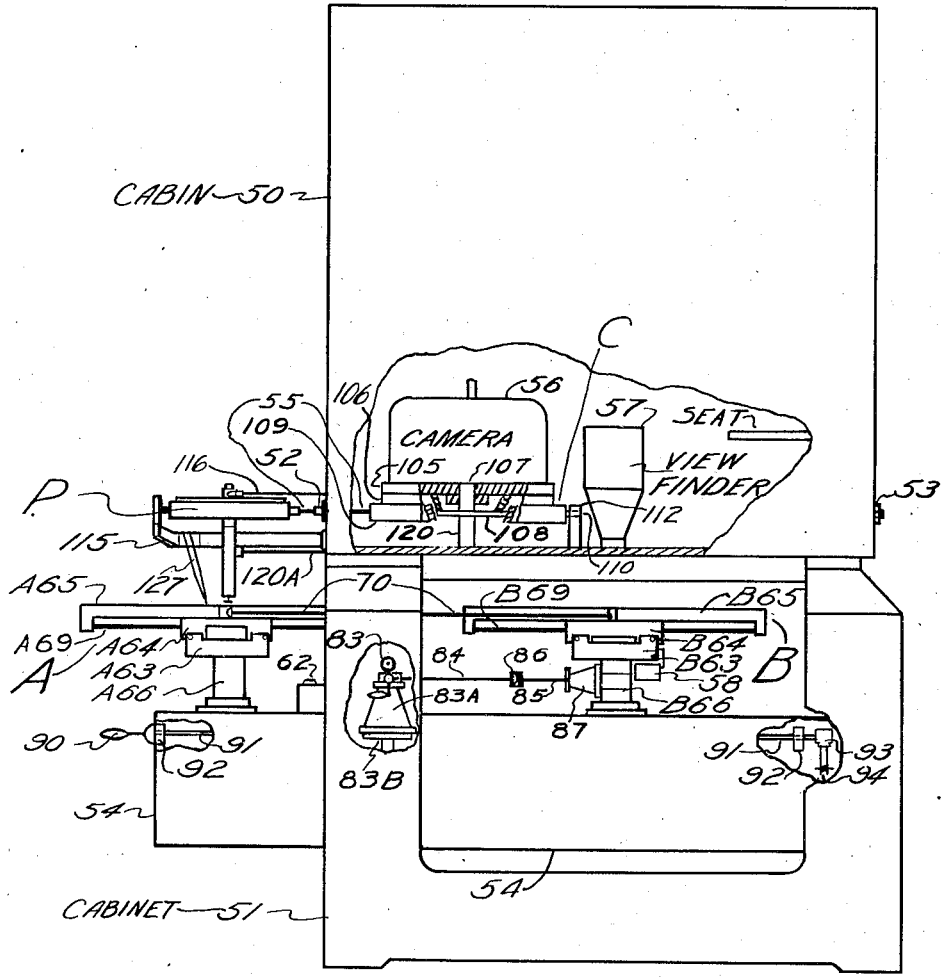
Figure 23:
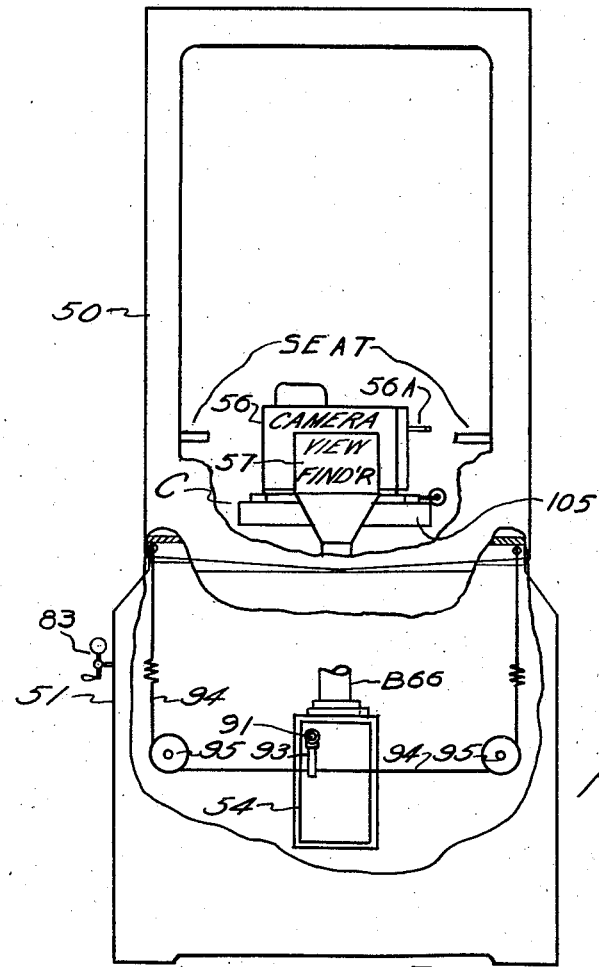
Figure 24:
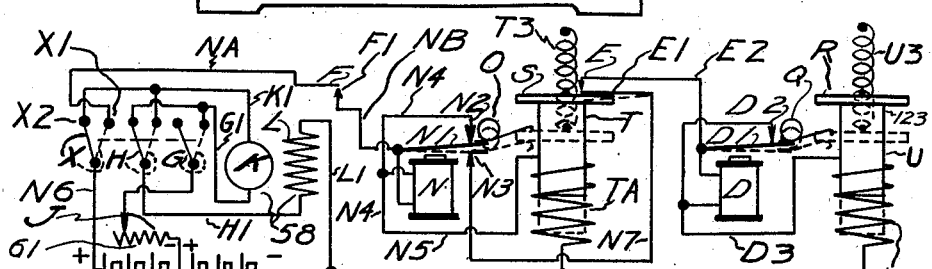

Figure 6 is a side elevational view of the trainer shown in Figure 1, with a portion of the cabin 50 cut-away to show the position of the camera 56, view finder 57, and student's seat; and with a portion of the camera mount C shown in section along the vertical axis of shaft 107 to show the relative positions of the inner ring 106 and outer ring 109 of the gimbal camera-mount C shown on an enlarged scale in Figures 21 and 22;

Figure 7 is a front elevational view of the table unit B as viewed in Figure 15, except the cabin 50, cabinet 51 and front table unit A have been omitted, and the parts shown on an enlarged scale to illustrate more clearly the relation of the various cooperating devices;

Figure 8 is an enlarged front elevational view of the table driving mechanism per se which appears in the central part of Figure 7;

Figure 9 is a partial elevational view taken along lines 9—9 of Figure 8, showing the worm-gear reduction-drive for shaft 77;

Figure 10 is a partial sectional view taken along lines 10—10 of Figure 8 to show the construction of the splined shaft 80;

Figure 11 is a partial elevational view taken along lines 11—11 of Figure 8 to show the relation of gear 81 and rack 82;

Figure 12 is a partial side elevational view of the escapement racks 100C and 100D appearing in the upper left hand portion of Figure 7, which view has been shown on an enlarged scale to illustrate more clearly the dog 99 and operating lever 101;

Figure 13 is a partial elevational view taken along lines 13—13 of Figure 12 to show the relation of the racks 100C and 100D, dog 99, lever 101 and push rod 96, which rod is engaged by the lever 101 when the table units have reached the end of their forward travel;

Figure 14 is a partial elevational view taken along lines 14—14 of Figure 12 to show the relation of the racks 100C and 100D, dog 99, lever 101 and push rod 97, which rod is engaged by the lever 101 when the table units have reached the end of their rearward travel;

Figure 15 is a front elevational view of the trainer shown in Figure 1, with a portion of the cabin 50 cut-away to show the camera 56;

Figures 16, 17 and 18 are schematic flight lines illustrating the record made by the student's marker SM, and the instructor's marker IM; the irregular line 34A in Figure 18 representing a simulated flight course, while the straight line in Figures 16, 17 and 18 represent a theoretical line of straight flight;

Figure 19 is a partial side elevational view of the table units A and B as viewed in Figure 6, except the cabin 50 and cabinet 51 have been omitted, and the parts shown on an enlarged scale to illustrate more clearly the relation of the various cooperating devices;

Figure 20 is a plan view of Figure 19;

Figure 21 is a partial side elevational view of the gimbal mount C for the camera 56 and the printer ring assembly P as viewed in Figure 6, except the cabin 50 and cabinet 51 have been omitted and the parts shown on an enlarged scale;

Figure 22 is a plan view of Figure 21;

Figure 23 is a rear elevational view of the trainer shown in Figure 1, with a portion of the cabin 50 cut-away to show the position of the camera 56; and a portion of the cabinet 51 cut-away to show the tilt pulleys 95, tilt cable 94, and the support ledge 54 for the table units A and B;

Figure 24 is a schematic diagram of the electrical circuit employed on the trainer shown in Figure 1;

Figure 25 is a partial front elevational view of the printing mechanism per se as viewed in Figure 15, except the table A, cabin 50, and cabinet 51 are omitted, and the parts shown on an enlarged scale;

Figure 26 is a bottom view of the student's marker printer;

Figure 27 is a bottom view of the instructor's marker printer;

Figure 28 is a partial side elevational view of the printing mechanism per se as viewed in Figure 6, except the table A, cabin 50 and cabinet 51 are omitted, and the parts shown on an enlarged scale;

Figure 29 is a partial front elevational view of the student's printing mechanism as viewed in Figure 25 and shown on an enlarged scale with the solid lines indicating the normal or rest position for the parts, and the broken lines indicating the relative positions in operating condition;

Figures 30 to 38, inclusive, diagrammatically illustrate the table units A and B in several of their operating positions relative to the pivotal axis A66 and B66 as indicated by the circles appearing within the margin of the respective table units; the table unit A having an open top and supporting a mosaic or photographic transparency more fully described hereinafter, and the table unit B having a solid top for supporting a record sheet to receive the printed impressions of the student's marker SM, instructor's marker IM and simulated flight course 34A; Figure 30 illustrates the relative positions of the table units in the middle of the central flight line without "crab"; Figure 31 illustrates the relative positions of the table units at the end of the central flight line without crab; Figure 32 illustrates the relative positions of the table units at the beginning of the central flight line without crab; Figure 33 illustrates the relative positions at the middle of the first flight line without crab; Figure 34 illustrates the relative positions at the middle of the last flight line without crab; Figure 35 illustrates the relative positions at the end of the last flight line with 20 degrees crab to the left; Figure 36 illustrates the relative position at the beginning of the last flight line with 20 degrees crab to the left; Figure 37 illustrates the relative positions in the middle of the central flight line with 20 degrees crab to the right; and Figure 38 illustrates the relative positions in the middle of the central flight line with 20 degrees crab to the left.

Referring now to Figures 1, 2, 15 and 23 of the drawings, numeral 50 designates a cabin and 51 a cabinet, the former mounted on the latter by means of bearings 52 and 53. As shown in Figure 6, a ledge 54 extends through the center of cabinet 51 for supporting table unit assemblies A and B. As illustrated in Figure 20, table tops A65, B65, of these units, are coupled together for simultaneous operation and manipulation by means of the connecting rods 70 pivoted thereto at pivots 71. On the front of the cabin, i. e. the right side as viewed in Figure 1 and left hand side in Fig. 6, is mounted the printing ring assembly indicated generally by reference character P while, in the cabin, is mounted the camera mount ring assembly, likewise generally indicated by C. These two ring assemblies, which are in the same horizontal plane and have a common axis, are connected by means of shaft 55, and are shown more completely in Figures 2, 3, 21, and 22. Bearings 52, 53 also have the same axis. Also mounted in the cabinet, but not shown, are the batteries or motor generator, either of which can be used in operating the trainer. While the present embodiment of this invention selected for this disclosure employs a 6–12 volt three wire system and electrical apparatus it is to be understood that other standard systems can be employed.

To approach actual operating conditions, there are mounted in the cabin 50, in a manner similar to the mounting in an airplane, a magazine 56 of a standard aerial camera and a view-finder 57 as illustrated in Figures 1, 6, 15 and 23. The usual camera mount in an airplane is a gimbal that permits correction for tilt of about 10 degrees throughout a horizontal angle of 360 degrees and also permits rotation of the camera about its vertical axis through 360 degrees. The usual mount for the view-finder may be either a gimbal, which will permit the same corrections that are possible with the camera, or it may be a ring that is fixed in the floor of the airplane and which permits corrections only about the vertical axis. It should be noted that the camera mount C used herein permits a universal movement of the camera of plus or minus 5 degrees from the horizontal. As shown in Figure 6, the camera is secured to a base 105 which simulates a camera cone and is free to rotate with the camera mount throughout a horizontal angle of 25 degrees each side of the longitudinal axis. The view-finder is preferably mounted in a gimbal (similar to the one shown for the camera) that permits the same amount of rotation and movement that is possible in the camera. The details of the mounting for the view-finder have not been shown.

The view-finder, which is standard equipment in all mapping airplanes, is a box-like affair that contains a lens and a piece of ground glass with the ground glass fixed at the proper distance from the lens so that all objects projected into the lens will be in focus on the ground glass. On this ground glass are drawn two lines parallel to each other and parallel to the latitudinal axis of the trainer and so spaced as to represent the distance to be traveled by the airplane between exposures. These lines will be referred to as the latitudinal lines on the view-finder. Also drawn on the ground glass are several lines equally spaced and which are parallel to the longitudinal axis of the trainer and which will be referred to as the longitudinal lines of the view-finder. The determination of the proper interval between exposures is governed by the amount of time it takes the airplane to travel the distance covered by the usable portion of each individual photograph, all in accordance with standard equipment employed in aerial map making.

As shown in Fig. 6, a table unit assembly B is rotatably mounted beneath the view finder 52, with the vertical axes thereof coincident with the axis of the view finder. Upon open table top B65 of this assembly is placed a transparency of an aerial "mosaic," as indicated by the letter M in Figure 20. An aerial mosaic as used herein is a pictorial representation of the ground made from aerial photographs by bringing them to uniform scale and fitting them together as practiced in the art of aerial mapping. A transparency is made of this assembly of photographs by photographically reproducing the same onto film. Moving this mosaic beneath the view finder for observation by the student constitutes a means for creating the illusion of an aerial vehicle flying over terrain or landscape.

As the table top carrying the mosaic is advanced in the forward direction by the drive motor 58 shown in Figure 7, the detail on the transparency, which is projected into the view-finder by the lamp 59, reflector 88 and mirror 60, simulates the movement of the ground under an airplane in flight as suggested above. The proper interval between exposures is determined by the student by observing the length of time that it takes a selected object on the mosaic to pass between the two latitudinal lines. Inasmuch as the interval between exposures is not the same on different flight lines, this change is introduced into the trainer by means of rheostat 61, shown by "J" in Figure 24, which controls the speed of motor 58, shown as KL in Fig. 24, thereby providing variation in the interval from 7 seconds to 25 seconds.

"Crab" is defined as the rotation of the camera on its vertical axis with respect to the track of the airplane. For satisfactory results on a map-ping mission, it is necessary for the photographer to hold the longitudinal axis of the camera parallel to the flight line at the instant of exposure to eliminate crab. To determine the correct angle of crab, the photographer rotates the view-finder about its vertical axis until the objects that are projected onto the ground glass move in a direction parallel to the longitudinal lines. When the view-finder has been turned to the proper crab angle, the camera is then rotated about its vertical axis until it is parallel to the view-finder or until it has the same crab angle as the finder. While it is practical to interconnect the camera and view-finder for simultaneous manipulation, the independent status of these units gives the student more training.

Tilt is defined as the rotation of the camera about its longitudinal or latitudinal axis. Vertical aerial photographs must be as free from tilt as possible. Tilt is due to the camera being moved about its longitudinal or latitudinal axis so that its vertical axis is not perpendicular to the ground at the instant of exposure. This is commonly caused by the airplane being moved about its horizontal axis and this displacement is corrected or compensated for by the photographer properly leveling the camera with the use of conventional level bubbles that are regular equipment on all aerial cameras. The most frequent direction of tilt is about the longitudinal axis but it also occurs in a fore and aft direction and this is commonly referred to as "tip." Inasmuch as it is difficult to level a camera in one direction without throwing it off level in another direction, tilt is introduced into this trainer in only one direction, which is about the longitudinal axis. However, in the event a greater degree of tip is desired cabin 50 can be mounted on an appropriate gimbal and manipulated by the instructor.

In actual mapping it is customary to fly a sufficient number of parallel flight strips to cover the area to be mapped. The usual procedure is employed for properly and equally spacing these strips. To simulate these different flights in the trainer, provision is made for automatically shifting the tables A and B laterally and providing for nine strips to each record sheet. At the end of each flight line, the tables are returned to the starting position by reversing the drive motor by means of switch X2 shown in Figure 24.

The apparatus for manipulating the mosaic and recording the position of the axis of the camera at the instant the student operates the camera trip will now be described. It should be remembered that the camera trip normally operates a camera shutter; here the camera trip closes contacts F—F1 controlling an electrical circuit, which is shown in Figure 24 and described more completely hereinafter. As illustrated in Figures 6, 7, 19 and 20, each table unit A, B, is composed of three sections: a base, an intermediate slide and the upper member referred to as "table top," designated as A63, A64, A65 and B63, B64 and B65, respectively. Base A63 is attached to the vertical shaft A66 by means of flange A67 while base B63 is attached to vertical shaft B66 by means of flange B67, Figure 20. This structure provides rotation about a vertical axis. The intermediate slide A64, which permits transverse motion, is mounted on the base A63 by means of horizontal rods A68 and B64 is mounted on B63 by means of B68 and slides transversely thereon. Table top A65 carries the record sheet and table top B65 carries the mosaic transparency. Table top A65 is attached to the intermediate slide by means of rods A69 and slides in a forward and backward direction on these rods while table top B is similarly mounted on corresponding members having corresponding designating characters of "B" series. These table tops are driven at a selected uniform speed by the drive motor 58 which is mounted on table unit B as shown in Figure 7. The direction of the movement of the table tops during instruction, or while exposures are made, is forward, i. e. from right to left, Figures 6 and 20.

In Figures 7 to 11, 19 and 20 inclusive, it will be noted that pulley 72 on motor 58, through belt 72A, drives pulley 73 attached to shaft 74 on the end of which is worm 75 that meshes with and actuates gear 76. Gear 76 is attached to shaft 77, which in turn is attached to bevel gear 78, which meshes with and rotates another bevel gear 79. The beveled gear 79 is slidably mounted on shaft 80, which permits gear 79 to actuate the splined shaft throughout the lateral travel of table top B65. At each end of this splined shaft is a gear 81, each of which mesh with a rack 82 attached to table top B on either side. This gearing drives said table top either forward or backward (also table top A65 through rods 70), depending on the direction in which the drive motor is run. In order to rapidly return the tables to the starting position, the speed of the motor is increased by raising the voltage applied to the motor. This is accomplished by means of the three contact double throw switch having switch blades X, H, G, as shown in Figure 24.

Crab is introduced into the trainer in response to rotating crab handle 83 by the instructor, which handle is shown in Figures 1, 6, 7, 15 and 20. This handle is attached to the crab actuating screw 84 shown in Figures 19 and 20, which screw in turn is threaded in nut 86 pivoted to an adjustable arm support 85, while the base 87 of this arm support is securely strapped to the vertical shaft B66, best shown in Figures 7, 19 and 20 and indicated in Figure 6. Thus as crab handle 83 is turned, the vertical shaft B66 is rotated, causing the table unit B to swing about its vertical axis, thereby introducing crab. Inasmuch as the two table units are connected by rods 70, as illustrated in Figure 20, table unit A is turned or crabbed the same amount and in the same direction as table unit B. The table units are so mounted that there is provided a maximum crab angle of 20 degrees each side or a total rotation of 40 degrees. It should be noted that screw shaft 84 is carried in outer bearing 84A that is pivotally mounted on pedestal 83A, which in turn is attached to cabinet 51 by a bracket 83B as shown in Figure 7.

The detail, or image, on the mosaic transparency, indicated generally in Figure 20 as M, is projected into the view-finder 57 by means of the projection lamp 59 shown in Figure 7. To the right of the lamp is a reflector 88 which reflects the light through a window 66W in vertical hollow shaft B66 onto a mirror 60 which is mounted therein at an angle of 45 degrees. From mirror 60, the light passes through a piece of opal glass 89G, which is held in spring brackets 89. The lower ends of these brackets are secured to the top side of table base B63 as indicated in Figure 7. Thus the opal glass diffuses and transmits the reflected light to and through that part of the mosaic under observation by the student in the view finder 57. It should be remembered that the top end of hollow shaft B66, indicated by the circles in Figures 30 to 38, inclusive, also indicate the part of the mosaic being observed by the student.

Tilt is introduced into the trainer by means of the tilt control handle 90 mounted on the lower front end of the trainer, Figures 1, 6 and 15. Moving this handle, which is attached to the tilt shaft 91, in an upward or downward motion moves said shaft about its horizontal axis. As shown in Figures 6 and 23, shaft 91 is longitudinally and off-centrally disposed in the trainer and extends through ledge 54, is mounted inside the table support ledge 54 by bearings 92, Figure 6. At the rear of shaft 91, arm 93 is keyed thereto, consequently this arm is rocked as the shaft is rotated. Attached to this arm 93, on either side, is cable 94 which is carried around pulleys 95 pivotally mounted to the cabinet, and then this cable 94 is anchored to the lower rear corners of the cabin, note Figure 6 as shown in Figure 23. Therefore, as tilt control handle 90 is moved in an upward or downward motion, the cabin 50 is rocked upon its horizontal axis on bearings 52 and 53 (note Figures 1 and 6), thus introducing tilt into the trainer. There is sufficient clearance between the lower corners of the cabin 50 and the cabinet 51 to allow tilting of 4 degrees either side of the horizontal, or a total movement of 8 degrees. Obviously, the range of the tilt can be varied as required.

An escapement mechanism has been provided for each table unit to shift them laterally after each flight line has been recorded, note Figures 7, 12, 13, 14, 19 and 20. Since duplicate escapement mechanisms are employed on units A and B the prefix letters will be dropped from the designating characters. There is in the rear of each table top (note Figure 20) an adjustable push rod 96 and in front of each table top another push rod 97. On the front side of each intermediate slide 64 is mounted a shaft 98 and on one side of each is attached dog 99. Just below this dog, but attached to each base, is an escapement mechanism, the racks are duplicates and so designed that each has a front and rear set of ratchet teeth equally spaced in staggered relation. (Note Figures 12 to 14.) Front teeth 100 are formed in bar 100C and spaced one inch apart and the rear teeth 100R are formed in bar 100D, also spaced one inch apart. The front set are spaced so that each front tooth is halfway between each rear tooth, thus making the lateral distance of one-half inch between adjacent teeth. There is attached to shaft 98, just to the right of dog 99, a dog operating lever 101. As the spring biased table tops reach the limit of their forward travel, push rod 96 engages the dog operating lever 101 which causes the shaft 98 to rotate and which, in turn, causes the dog to shift from a front tooth to the line of rear teeth allowing the tables to shift laterally one-half of a flight line in response to a spring, described presently. As the table tops reach the limit of their backward travel, push rod 97 engages the dog operating lever thereby causing the shaft 98 to rotate and which, in turn, causes the dog to shift from a rear tooth to the line of front ratchet teeth, allowing the table to shift laterally again one-half of a flight line. Therefore, between flight lines the table tops will shift one inch and provide space for a full flight line. Although the dog permits the lateral shifting, the shifting is done by means of the spring roller 102 (Figure 7) attached to the right side of the table base members 63 and to which is attached cable 103, around pulley 103B which in turn is attached at 103A to the near side of the intermediate slide. Thus, the table tops are pulled over as the dogs release them after each flight. To permit hand shifting of the tables, there is provided a knob 104 on shaft 98 on the side opposite the dog, this allows manual shifting on orientation of the dog for returning the tables to the first flight strip.

As crab and tilt are introduced into the trainer by the instructor, it is necessary for the student to make corrections with the camera to offset or compensate for these errors. After the degree of crab is determined by means of the view-finder, the camera is rotated about its vertical axis so that it is parallel to the view-finder. The camera mount C is a gimbal, thereby providing for universal movement within the indicated limits. As shown in Figures 6, 21 and 22, rotation of the camera for crab correction is made possible by the camera magazine being pivotally attached to the top of the cone 105. Attached to the lower part of and through the center of inner camera mount ring 106 is bar 108 and secured to the center of this bar is vertical shaft 107 which extends upward to the center of the mount ring assembly. In Figure 6 the cone 105 and gimbal mount C are shown partially in section along the vertical axis of shaft 107 to show the bar 108. Cone 105 has a centrally located hole into which is passed the shaft 107 for rotatively mounting the cone on shaft 107. As shown in Figures 21 and 22, the outer camera mount ring 109 is attached to shaft 110 at the rear or right side thereof and this shaft 110 is mounted in a bearing 112 which is secured to the floor of the cabin. The outer ring 109 is also attached to shaft 55 at 55 B on the front of the ring 109, which shaft passes through front wall 55A of the cabin 50 and is fixed to the outer printing ring PR of assembly P and it should again be noted that this shaft 55 is the horizontal axis of the cabin-cabinet assembly and that said shaft ties the outer ring of the printing and camera mount gimbals together, it should also be noted again that it is about this axis that the cabin 50 is rocked to introduce tilt. With the camera mount rings so connected to each other and to the trainer, it is possible for the student to make correction for tilt in any direction. For leveling the camera mount ring assembly and the printer mount ring assembly when the trainer is set up, there is provided level adjusting screws 111.

Inasmuch as no photographs are made with the camera in the trainer and one of the objects of this invention is to provide a record of the manipulations of the camera and the trainer during instruction, there is attached to the front end of the cabin a printing apparatus for imprinting the student's and the instructor's markers on paper as a record. This assembly is generally referred as P. (Note Figures 1, 6, 15, 21, 22 and 25 to 29.) This assembly is also a gimbal, however the rings are smaller in diameter, as indicated in Figures 1 and 22. The outer or front extremity of printing ring PR is attached to the cabin by means of shaft 113 that is mounted in bearing 114 in the printing ring support bracket 115. The rear of this outer ring is mounted on shaft 55 that is attached to the outer camera mount ring 109. Thus the printing ring assembly and the camera mount ring assembly are in the same horizontal plane and rotate about the same axis as a unit. Pivotally attached to the side of the cone 105, on which the camera magazine 56 is mounted, is a connecting link 116 that is also pivotally connected to the spider 117 which rotates about a vertical shaft 118 by arm 116A mounted on said spider in the center of the inner printing ring 119. (Note Figure 22.) Therefore, when the camera is rotated to correct for crab, spider 117 is rotated correspondingly and in the same direction as the camera. Since the outer mount ring and outer printing ring are mounted on the same horizontal axis, any tilt correction that is made in the camera along the longitudinal axis is transmitted to the printing ring. 117A is a cross bar in ring 117.

On the bottom of the inner camera mount ring 106 there is rigidly attached bar 108, to which is rigidly attached a vertical shaft 120 extending downwardly. Note Figure 21. Connected to shaft 120 is another connecting rod 120A, which in turn is connected to the vertical shaft 118 that is attached to the inner printing mount ring. The actions and reactions of the student in his efforts to correct the camera for tilt in a fore and aft direction are transmitted through this rod 120A to the inner printing mount ring. Thus, it is seen that when any corrections are made in the camera for tilt in any direction or for crab these corrections are transmitted to the printing rings.

The two electro-mechanical printers for actuating the instructor's and student's type bars are substantially duplicates, therefore a detailed description of one will suffice. In Figure 25 the student's printer is designated by numeral 121 and the instructor's by numeral 122. An enlarged front and side view of the student's printer are shown in Figures 28 and 29. Although the printers are similar, the markers or type are different. The student's marker is shown in Figure 26, while the instructor's marker is shown in Figure 27. The instructor's printer 122 is attached to the printing ring support bracket 115, consequently is in a fixed position relative to the cabin since it is attached thereto at 115B. Therefore, any motion that is introduced into the cabin of the trainer by the instructor to simulate tilt is recorded by this printer. The student's printer is attached to spider 117, therefore is in a fixed position relative to the camera and, since all manipulations of the camera are transmitted to this spider, printer 121 records the manner in which the camera was manipulated by the student for correction or aiming the camera for making a good vertical photograph.

Photographs are normally made by actuating the camera shutter by means of the shutter lever 56A shown in Figure 1, and this operation can be referred to as tripping the camera and this phrase will be used herein when reference is made to this operation. As employed herewith, the actuation of this shutter lever closes contacts of switch F, F1, Figure 24.

When the student has determined the proper interval between exposures and made corrections for crab and tilt, he trips the camera to actuate the printing mechanism which is activated by solenoids, the plungers 123 thereof operating the markers. The structure of this part of the apparatus will appear later herein.

As illustrated in Figures 25 to 29, each marker is attached to its respective "wish bone" arm 124 which in turn is pivoted at 124A to bracket 124B, arm 124 is coupled to the connecting link 125, that in turn is articulated to plunger 123 of the solenoid. By means of 123A the markers are held in the "up" or at-rest position by tension from springs 124S and this tension is overcome when current is applied to the solenoids. The printing cycle is such that the instructor's printer is first operated and, upon its return to a normal or rest position, the student's printer is operated. Although the student's printer is operated after the instructor's printer, the speed of operation of the printers is so great, in fact so nearly instantaneous that the displacement between the markers is not discernible even with the table tops moving at maximum speed. The actual printing is accomplished by the markers striking a standard inked ribbon 126, thus reproducing each marker symbol on the record sheet. This ribbon, wound on spools 170 and 171, is advanced by means of a ratchet, not shown, that is attached to take-up spool 171. The ribbon is advanced every time an exposure is made, by the action of the instructor's printer. Take up spool 171 is attached to instructor's printer mount 124B by means of bracket 171A. The ribbon guide 126A is pivoted to instructor's printer mount at 171B and is pivoted only at this point. The guide is supported by the ribbon guide 126A, carrier 170A, which carrier in turn rests on rod 170B, note Figure 22. The ribbon supply spool is attached to the guide carrier at 170C and at the same point the guide is attached to guide carrier.

Although the two markers are referred to as the instructor's and the student's, it must be pointed out that the instructor has no control over the operation of either printer, as they are both operated by the student when he trips the camera or actuates the lever for closing contacts F, F1, Figure 24. In addition to the instructor's and student's markers, there is attached to the printing ring support bracket a tracer pen 127. This pen records the manner in which the trainer has been operated by the instructor. That is, whether the crab and tilt were introduced roughly or smoothly and whether the conditions under which the student was working represented smooth or rough flying.

Attention is again directed to the instructor's marker and the student's marker as shown in Figures 27 and 26, respectively, and explained above. From the record that is made during use under instruction, it is possible to determine the degree and direction of the difficulties or movements introduced into the trainer by the instructor, the approach to perfection, the degree and direction of the mistakes that the student made. The record sheets used on the trainer will have drawn on them nine finely inscribed lines one inch apart to represent flight lines. The degree of crab in either the instructor's or student's marker is determined by measuring the angle between either marker and the flight line. The amount of tilt is determined by measuring the perpendicular distance between the flight line and the center of either marker. Thus, it is seen that tilt on these records is shown as displacement from the flight just as it is on a photograph. The trainer printing mechanism is so designed that 0.25 inch displacement from the flight line represents 2 degrees of tilt. The degree of fore and aft tilt, which will be referred to as "tip," is found by measuring the distance, parallel to the flight line, from the center of the student's marker to the center of the instructor's marker. Here also, 0.25 inch displacement represents 2 degrees. The amount of forward overlap is determined by the distance between the points where the succeeding instructor's markers cross the flight line and, on the trainer, 60 percent overlap is represented by a distance of 0.75 inch between instructor's markers.

In Figure 16, numerals 140 to 143 show the instructor's marker operated independently of the student's marker, likewise 144 to 147 show the student's marker operated independently of the instructor's marker. Records exactly of this nature do not happen during operation of the trainer, but have been shown here to illustrate the difference in the markers; numeral 140 shows the instructor's marker without any error introduced into the trainer; numeral 141 with 2 degrees of tilt to the right; numeral 142 with 20 degrees of crab to the right; and numeral 143 with 2 degrees of tilt and 20 degrees of crab to the left. Numerals 144, 145, 146 and 147 show the student's marker with the errors enumerated above introduced into the camera. Numerals 148 and 149 illustrate both markers operated and without any errors in either. Numeral 150 shows both markers without crab or tilt, but without the proper interval between exposures or, as is commonly called, insufficient overlap with marker 149 and excessive overlap with marker 151. Numeral 152 shows both markers without any error and with proper overlap.

In Figure 17, numeral 153 shows that the instructor introduced 2 degrees of tilt to the left that the student failed to correct; numeral 154 shows that the student overcorrected by 2 degrees, while numeral 155 shows that the student made the proper correction. Numeral 156 shows that the instructor introduced no tilt but 20 degrees of crab to the right which the student failed to correct. Numeral 157 shows that the student overcorrected his crab by 20 degrees; while numeral 158 shows that the student made the proper crab correction. Numerals 159 and 160 show that the instructor did not introduce any error in the trainer, but numeral 159 shows that the student had his camera tilted about the latitudinal axis causing tip of 2 degrees in a forward direction, while numeral 160 shows that the student had his camera tilted about the same axis but in an opposite direction causing 2 degrees of tip in a backward direction. This is shown by the displacement between the centers of the instructor's and student's markers. Numeral 161 shows that the instructor introduced 2 degrees of tilt and 20 degrees of crab and the student corrected for the tilt but not for the crab. Numeral 162 shows that the instructor introduced 20 degrees of crab to the right and 2 degrees of tilt to the left and the student overcorrected his crab and tilt but had about 2 degrees of tip. Numeral 163 shows that the instructor introduced 20 degrees of crab to the right and 2 degrees of tilt to the left and the student did not make quite enough correction for crab or tilt and had his camera tilted about the latitudinal axis so that there is about 2 degrees of tip. Numeral 164 shows that there was 1 degree of tilt to the right and 20 degrees of crab to the left introduced into the trainer and the student corrected for these errors but failed to trip the camera at the correct time resulting in insufficient overlap with marker 163. Numeral 165 shows that there was introduced into the trainer 20 degrees of crab to the right and 1 degree of tilt to the right and the student made the necessary corrections and has proper overlap or interval. It has been mentioned before that there is a tracer pen attached to the trainer but the line from this pen has been omitted from Figures 16 and 17 as they are not typical flight lines and its absence makes it possible to more clearly describe the above markings.

Figure 18 is a typical flight line as done by a student on the trainer. The imprints of the instructor's marker show that there was tilt and crab introduced into the trainer throughout the flight and the irregular tracer line, 34A made by pen 127, shows that the trainer was handled irregularly or roughly throughout the period of training. The imprints of the student's marker show that he manipulated the camera skillfully and held it almost level at the instant of each exposure throughout the flight and properly corrected for crab and the interval between the exposures was satisfactory. It should be noted that the distance traveled by the table tops A63, B63 permits 18 exposures to be made to each flight line if the forward overlap, or proper overlap between exposures, is maintained. However the space on drawing herewith permits only 13 exposures.

Figures 4 and 5 schematically represent a modified apparatus for simulating ground movement in terms of a view-finder, or a means for creating the illusion that the trainer is an aerial-vehicle flying over terrain. These figures also show a modified structure for recording the movements and operations as explained hereinbefore.

On table 200 a pair of rollers 201 and 202 are pivotally mounted and geared to rotate in opposite directions through gears 203 and 204. These rollers are driven through bevel gears 205, shaft 206, worm gear and worm 207 by motor 208. Pulley 209 drives pulley 210 and paper (or film) take-up spool 211 through spring belt 212. The record paper strip 216, before passing through rollers 201 and 202, by which it is driven, passes over platen 213 and roller 214 from the supply spool 215. Correct tension is attained on record paper strip 216 by brake 217. Table 218 is identical with table 200 except for the following: a mosaic transparency 219, is used for simulating ground movement; an illuminating source 220, aided by reflector 221; a mirror 227 to direct the light upward through a sheet of opal glass 222 which properly disperses the light for readily viewing the transparency. Tables 200 and 218 are rotatably coupled by connecting rods 223, which rods are pivotally attached to table arms 224 at 223B. The tables rotate about a vertical axis, centrally located in shafts 225 and 226.

The circuit shown in Figure 24 has been developed to actuate plungers T, U, (123, in Figure 25) to apply markers IM, SM sequentially to prevent conflict of the actuating arms 124 and to effect these movements instantly for accuracy and to prevent blurring of the record since the latter is in motion when the marker types contact the record sheet.

When the camera shutter lever is tripped by the student, with the 3 blades X, H and G of the two position switch in the broken line position, as shown in Figure 24, the shutter lever closes contacts F, F1, and current passes through the primary circuit consisting of: wire N6 from the terminal of the battery through blade X, contact X1, wire NA, contacts F, F1, wire NB, contacts N1, N2, wire N4 to solenoid TA and negative return wire E5 to battery M2—M, thereby moving plunger T from the solid line to the dotted line position, whereupon flange S, an integral part of plunger T, opens contacts N1, N2 and closes contacts N1, N3 and puts a feed on wire 7 connected to contact E1. Plunger T is biased to the full line or normal position by spring T3 in Figure 24. This corresponds to springs 124S in Figure 28. The opening of contacts N1, N2 removes the shunt from and energizes winding N5 of stick relay N. It should be noted that winding N5 is of a great number of turns of small wire in terms of winding TA, which has relatively few turns of a coarse wire. Therefore, when the current flowing to TA is limited by winding N5 there are not sufficient ampere-turns in TA to effect movement of plunger T. Since contact E1 is a spring leaf having a normal set to remain open (the dotted line position) so long as flange S and plunger T are in the actuated position by solenoid TA, current is prevented from flowing to contact E, and sub-circuit consisting of: wire E2, contacts D1, D2, wire D3, winding U1, return wire E5 to battery. This is the feed circuit from winding U1. However it is to be noted that contacts E, E1 are opened for only an instant since the opening of contacts N1 and N2 opens and retains open the direct feed to TA so long as contacts F, F1 remain closed, also the front contacts of relay N remain closed until contacts F, F1 are opened. This energizes the secondary circuit which, as stated, actuates solenoid U1 and instantly moves plunger U from its full line to its broken line position. Plunger U is biased to the full line or normal position by spring U3. During this operation the back contacts of stick relay D are opened and so retained as long as contacts F, F1 are closed. Since the relation of windings D and U1 are the same as N5 and TA, the full cycle of operation of plunger U is instantaneous. It necessarily follows that the closing of contacts F, F1 effect sequential operation of plungers T, U, respectively; since plunger 123 (T in Figure 24) operates the instructor's marker, IM in Figure 28, and plunger 123 (U in Figure 24) operates the student's marker SM.

Attention is again called to the fact that the electro-mechanical apparatus, shown on an enlarged scale in Figures 28 and 29, for actuating the student's and instructor's markers SM, IM, respectively, are substantial duplicates. In Figure 28 relay designated generally as 123C corresponds to stick relay N, in Figure 24. Relay D is similar in construction to relay N, except relay D has only a back contact, while relay N has both a front and back contact. Note Figure 24. Characters O and Q designate loops or springs to provide resiliency to the armatures with which they are associated.

In Figure 24 there is shown also a motor circuit that is separate from the primary and secondary circuits described. This circuit is controlled by blades H, G of the double throw switch and arranged for driving the motor in a forward direction on battery current at six volts and in reverse on substantially twelve volts for increased speed. This switch also interrupts the supply of current when in the vertical or neutral position.

When the switch blades are in the dotted line position, the motor is operating on 6 volts and driving table tops A65 and B65 in a forward direction. The circuit used for this connection extends from the + terminal of battery M through variable resistance J, through blade G, wire G1 to motor armature K, blade H, wire H1, through motor field L, wires L1, E5 to the negative terminal. It should be noted that when blades X, H, G, are in the dotted position, the motor is operating at normal speed and the printing apparatus can be operated, also that when the table tops A65 and B65 have reached the limit of their forward travel, the switch blades G, H, X are thrown to the solid line position by the instructor, reversing the table driving motor and the direction of motion of the tables by directing current from + terminal battery M2 through blade X, contact X2, wire NA, through armature K, wire G1, blade H, wire H1, then through field L, wires L1, E5 to the negative terminal of battery M. It should be noted that when the blades are in the solid line position for reversing the motor and returning the tables to the starting position, the feed circuit to the printing apparatus is open, therefore inactive and the printing elements protected against inadvertent operation. Switch levers 62, 61, Fig. 15, are accessibly placed on the front of the trainer for manipulating these three blades and varying resistor 5, respectively.

It will be perceived from the foregoing description and drawings that in the present preferred embodiment of my invention many of the elements entering into training aerial photographers and/or bombardiers can be employed simultaneously for the more advanced student, however, it should be noted that certain sub-combinations of these elements can be employed when it is desired to subject students to only elementary training, therefore, I wish to be limited only by the prior art and the appended claims.

I claim:

1. An aerial trainer for zenithial photography comprising, a cabin; means for tilting the cabin in simulation of the tilting of an aeroplane in actual flight; a camera movably mounted on the cabin having an exposure release operable to simulate the making of a photographic exposure; means for laterally rotating and tilting the camera to correct for deviation from a true horizontal and longitudinal flight course; a view finder defining the field of the camera and movably mounted upon the cabin for determining the position of the cabin relative to a simulated flight course by observing the movement of terranean objects in the view finder; a terranean photograph movably mounted beneath and in registry with the view finder; means for longitudinally moving the photograph to simulate the conditions of longitudinal flight in the view finder and means for laterally turning the photograph relative to the longitudinal axis of the cabin to simulate the introduction of crab into the longitudinal flight of an aeroplane; means for laterally rotating and tilting the view finder to determine the deviation from a true horizontal and longitudinal flight course; a record sheet movably mounted beneath the cabin; means for moving the record sheet in accordance with the movement of the photograph; recording means secured to the cabin and movable therewith for tracing the simulated line of flight upon the record sheet; a first recording mechanism secured to the cabin and movable therewith for recording upon the record sheet the simulated deviation of the cabin from true horizontal and longitudinal flight; a second recording mechanism secured to the camera and movable therewith for recording upon the record sheet the relative positioning of the camera to correct for the flight deviations observed in the view finder; and means operatively associated with the exposure release of the camera for actuating the said first and second recording mechanisms to record the simulated deviations existing at the time the exposure release is operated.

2. An aerial trainer for zenithial photography comprising a cabin; means for tilting the cabin in simulation of the tilting of an aeroplane in actual flight; a camera movably mounted upon the cabin having an exposure release operable to simulate the making of a photographic exposure; a view finder for the camera; means for laterally rotating and tilting the camera to correct for deviations from a true horizontal and longitudinal flight course observed in the view finder; a terranean photograph movably mounted beneath and in registry with the view finder; means for moving the photograph to simulate the conditions of actual flight in the view finder; means operatively associated with the cabin and the photograph for recording the simulated line of flight of the cabin relative to the photograph; a first recording mechanism operatively associated with the cabin and the photograph, and operable to record the simulated deviation of the cabin from a true horizontal and longitudinal flight course; a second recording mechanism operatively associated with the camera and the photograph and operable to record the relative positioning of the camera to correct for the flight deviations observed in the view finder; and means operating in response to an operation of the exposure release, for operating the first and second recording mechanisms to record the simulated deviations existing at the time of making the simulated photographic exposure.

3. An aerial trainer for zenithial photography comprising a cabin; a camera movably mounted upon the cabin having an exposure release operable successively to simulate the making of photographic exposures in succession; a view finder for the camera; a terranean photograph mounted beneath and in registry with the view finder; means for moving the cabin and the photograph relative one to the other to simulate the tilting and turning of an aeroplane in actual flight to simulate deviations of actual flight in the view finder; means for moving the camera to correct for the deviations observed in the view finder; a first recording mechanism operatively associated with the cabin and the photograph, and operable to record the simulated deviation of the cabin from a true horizontal and longitudinal flight course; a second recording mechanism operatively associated with the camera and the photograph, and operable to record the relative positioning of the camera to correct for the deviations observed in the view finder; and means operating in response to an operation of the exposure release, for operating the first and second recording mechanisms to record the simulated deviations existing at the time of operating the exposure release.

4. An aerial trainer as defined in the preceding claim comprising, means operatively associated with the first and second recording mechanisms and the photograph, for recording the relation existing between the photographic field of the successive photographic exposures.

5. An aerial trainer of the grounded type comprising, a cabin; mechanism movably mounted upon the cabin and requiring definite alignment with terranean objects in accordance with visual observations; control means for the mechanism adapted to be operated when the required alignment of the mechanism is obtained; a view finder for the mechanism; a terranean photograph mounted beneath and in registry with the view finder; means for moving the cabin and the photograph relative one to the other to simulate the movement of an aeroplane in actual flight to simulate deviations of actual flight in the view finder; means for moving the mechanism to obtain the required alignment with the terranean objects observed in the finder; a first recording device operatively associated with the cabin and the photograph, and operable to record the simulated deviation of the cabin from a true horizontal and longitudinal flight course; a second recording device operatively associated with the mechanism and the photograph, and operable to record the positioning of the mechanism; and means operating in response to an actuation of the control means, for operating the first and second recording devices to record the simulated deviations existing at the time of actuating the control means.

6. An aerial trainer as defined in the preceding claim comprising, means operatively associated with the cabin and the photograph for recording the simulated line of flight of the cabin relative to the photograph.

7. An aerial trainer of the grounded type comprising, a cabin; means for tilting the cabin in simulation of the tilting of an aeroplane in actual flight; a mechanism movably mounted upon the cabin requiring definite alignment with terranean objects in accordance with visual observations; control means for the mechanism adapted to be operated when the required alignment of the mechanism is obtained; a view finder for the mechanism; a terranean photograph movably mounted beneath and in registry with the view finder; means for longitudinally moving the photograph to simulate the conditions of longitudinal flight in the view finder, and means for laterally turning the photograph relative to the longitudinal axis of the cabin to simulate the condition of crab introduced into the longitudinal flight of an aeroplane; means for moving the mechanism to obtain the required alignment with the terranean objects observed in the finder; a record sheet movably mounted beneath the cabin; means for moving the record sheet in accordance with the movement of the photograph; a first recording device secured to the cabin and movable therewith, for recording upon the record sheet the position of the cabin relative to a true horizontal and longitudinal flight course; a second recording device secured to the mechanism and movable therewith for recording upon the record sheet the relative positioning of the mechanism; and means operatively associated with the control means for actuating the first and second recording devices, to record the simulated conditions existing at the time the control means is actuated.

8. An aerial trainer as defined in the preceding claim comprising, recording means secured to the cabin and movable therewith for tracing the simulated line of flight upon the record sheet.

9. An aerial trainer for zenithial photography comprising, a cabin; means for tilting the cabin to simulate the condition of tilting an aeroplane in actual flight; a dummy camera movably mounted upon the cabin and having an exposure release operable successively to simulate the making of photographic exposures in succession; a view finder for the camera; a terranean photograph mounted beneath and in registry with the view finder; means for longitudinally moving the photograph to simulate the conditions of longitudinal flight in the view finder, and means for laterally turning the photograph relative to the longitudinal axis of the cabin to simulate the condition of crab introduced into the longitudinal flight of an aeroplane; means for rotating and tilting the camera to obtain the required alignment with the terranean objects observed in the view finder; a first recording mechanism operatively associated with the cabin and the photograph, and operable to record the position of the cabin relative to a true horizontal and longitudinal flight course; a second recording mechanism operatively associated with the camera and the photograph, and operable to record the relative positioning of the camera; and means operating in response to an operation of the exposure release, for operating the first and second recording mechanisms, to record the simulated conditions existing at the time of operating the exposure release.

10. An aerial trainer as defined in the preceding claim comprising, means operatively associated with the cabin and the photograph, for recording the simulated line of flight of the cabin relative to the photograph; and means operatively associated with the first and second recording mechanisms and the photograph for recording the relation existing between the photographic field of the successive photographic exposures.

11. An aerial trainer for zenithial photography comprising, a cabin; a camera movably mounted upon the cabin having an exposure release operable to simulate the making of a photographic exposure; a view finder for the camera; means for presenting photographic images of terranean objects beneath and in registry with the view finder; means for moving the cabin and the photographic images relative one to the other to simulate the conditions of actual flight in the view finder; means for moving the camera to obtain the required alignment with the images observed in the finder; a first recording mechanism operatively associated with the cabin and the photographic presentation means, and operably to record the position of the cabin relative to a true horizontal and longitudinal flight course; a second recording mechanism operatively associated with the camera and the photographic presentation means, and operable to record the relative positioning of the camera; and means operating in response to an operation of the exposure release, for operating the first and second recording mechanisms to record the simulated conditions existing at the time of operating the exposure release.

12. An aerial trainer of the grounded type comprising a cabin; visual means presenting representations of elements as observed by an occupant of a plane in actual flight; means for moving the cabin and the visual means relative one to the other, to simulate the conditions of actual flight; mechanism mounted upon the cabin and requiring definite alignment with certain of the aforesaid representations; control means for the mechanism adapted to be operated when the required alignment of the mechanism is obtained; a first recording device operatively associated with the cabin and the visual means, and operable to record the position of the cabin relative to a true horizontal and longitudinal flight position; a second recording device operatively associated with the mechanism and the visual means, and operable to record the alignment of the mechanism; and means operating in response to an operation of the control means, for operating the first and second recording devices to record the simulated conditions existing at the time of the operation of the said control means.

13. An aerial trainer of the grounded type comprising, a cabin; visual means presenting representations of elements as observed by an occupant of a plane in actual flight; means for moving the cabin and the visual means relative one to the other to simulate the conditions of actual flight; a mechanism movably mounted upon the cabin and requiring definite alignment with certain of the aforesaid representations; means for moving the mechanism to obtain the required alignment; a first recording device operatively associated with the cabin and the visual means, and operable to record the position of the cabin relative to a true horizontal and longitudinal flight position; a second recording device operatively associated with the mechanism and the visual means, and operable to record the positioning of the mechanism; and control means for operating the first and second recording devices to record the simulated conditions existing at the time of the operation of the control means.

14. An aerial trainer of the grounded type comprising, a cabin; visual means presenting representations of elements as observed by an occupant of a plane in actual flight; means for moving the cabin and the visual means relative one to the other to simulate the conditions of actual flight; a first recording device operatively associated with the cabin and the visual means for recording the simulated line of flight of the cabin relative to the visual means; a second recording device operatively associated with the cabin and the visual means, and operable to record the position of the cabin relative to a true horizontal and longitudinal flight position; and control means for operating the second recording device for recording the simulated deviation of the cabin existing at the time of the operation of the control means.

WALLACE SIDNEY PARK.

REFERENCES CITED

The following references are of record in the file of this patent:

UNITED STATES PATENTS

| Number | Name | Date |
|---|---|---|
| 1,269,374 | Brodstrom | June 11, 1918 |
| 2,313,480 | Reid | Mar. 9, 1943 |
| 2,230,149 | Weddington | Jan. 28, 1941 |
| Re. 13,310 | Pogolski | Nov. 7, 1911 |
| 1,402,498 | Horn | Jan. 3, 1922 |
| 1,939,706 | Karnes | Dec. 19, 1933 |